UNITED STATES PATENT OFFICE 2,430,231

SULFONATED AMINO-PHTHALALKYLOL-IMIDES

Harold T. Lacey, Plainfield, and Robert E. Brouillard, Somerville, N. J., assignors to American Cyanamid Company, New York, N. Y., a corporation of Maine No Drawing. Application January 12, 1945, Serial No. 572,580

6 Claims. (Cl. 8—54)

This invention relates to a series of fluorescent compounds, to a method of producing them, and to nitrogenous fibers colored therewith.

Fluorescent fibers have become an interesting product of the textile industry. They are used in producing colorless textiles and prints which are visible under ultra-violet light and which have been adapted to wide use in advertising, decoration, exhibitions and in stage work. Many novel, beautiful and variable effects can be obtained by their use. For example, in entertainment centers this phenomenon has been effectively used to change the appearance of even the entire room simply by changing the wave length of the light used for illumination to the ultra-violet end of the spectrum. Such materials also have been variously used in rugs, upholstery and furnishings in theatres or other buildings which are kept in semi-darkness. The usual blind sensation encountered on entering such an auditorium is overcome by the glow emitted from the treated materials under the influence of ultra-violet radiations.

According to this invention, the desired effect on nitrogenous fibers, such as wool, silk, "aralac" and the like, is obtained by dyeing these fibers directly with a sulfonated aminophthalalkylolimide capable of representation by the following structural formula:

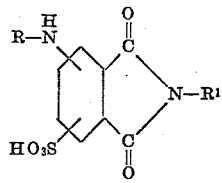

in which R is a member of the group comprising hydrogen and substituted or unsubstituted hydrocarbon radicals and R' is an alkylol radical. The preparation of the aminophthalimides and aminophthalalkylolimides is fully set forth in our copending applications, Serial Nos. 547,988 (now U. S. Patent 2,412,817) and 547,987, filed August 3, 1944, of the former of which the present application is a continuation-in-part.

It will be noted from the above general formula that R may be a hydrocarbon radical. The range of equivalents from which it may be selected is very wide. For example, it may be an alkyl radical, such as methyl, ethyl, propyl, butyl, and the like. The alkyl radicals may be substituted, as for example in such hydroxyalkyl groups as methylol, ethylol and the like, or in halogenated alkyl radicals such as chloroethyl and the like, or may be an alkenyl radical such as allyl, methallyl and the like. R also may be a substituted and unsubstituted aryl radical, such as phenyl, chlorophenyl, naphthyl, aminonaphthyl, and the like; an aralkyl radical, such as benzyl, chlorobenzyl, naphthomethyl, nitronaphthomethyl and the like; or a saturated cyclic radical, such as cyclohexyl, methylcyclohexyl and the like. $R^1$ may be substantially any of the lower alkylol radicals containing from about 1–4 carbon atoms. A typical example of compounds which are contemplated in the scope of the present invention is sulfonated 3-aminophthalethylolimide.

As noted in our above-mentioned copending applications, the substituted phthalimides of the present invention may be prepared by any suitable method. One such procedure is to prepare a salt of suitable phthalimide and treat the latter with a halide of the radical which is to be attached to the imide nitrogen. At the same time, or subsequently thereto, the other nitrogen of the aminophthalimide may be substituted. Or, if desired, a halophthalic acid or its anhydride may be treated with an alkylolamine to form an alkylolaminophthalalkylolamide which on heating is easily ring-closed to the imide.

Perhaps the simplest method in operation, and the most economical to carry out, is the preferred method in which a nitrophthalic acid is condensed with an amine and the resultant amide is heated sufficiently to be dehydrated to the nitroimide. The nitro group can then be reduced by any known method. The aminophthalimide so produced may then be treated if so desired to substitute in the amino group. However prepared, the aminophthalimides are then sulfurated to produce the dyestuffs of this invention.

In general, the sulfonated aminophthalimides fluoresce a bright blue in very dilute solutions but the shade gradually turns to a yellow-green as the solutions become more concentrated. When nitrogenous fibers, such as wool, are dyed with sulfonated aminophthalimides, dyeings are obtained which are white or very pale yellow in daylight and brilliant blue to yellow-green under ultra-violet light. When strong daylight shades are desired the sulfonated aminophthalimides may be incorporated with nonfluorescent dyestuffs to produce dyeings which under ordinary light possess the color characteristics of the nonfluorescent dye and which, under ultra-violet light, fluoresce in the shade of the non-fluorescent dyestuff. Thus, when a mixture of Naphthalene Acid Green V (C. I. 735) and sulfonated 3-aminophthalethylolimide is dyed on wool, a bright green dyeing is produced. The color properties are comparable in either daylight or ultra-violet light.

The invention will be more fully illustrated in connection with the following examples which are illustrative only and not by way of limitation. All parts are by weight unless otherwise noted.

*Example 1*

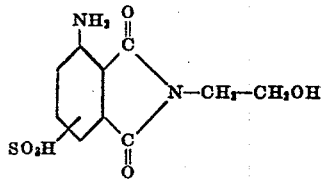

53 parts of 3-nitrophthalic acid is slurried in 50 parts of water and 16.8 parts of monoethanolamine is added. An exothermic reaction results and the temperature of the reaction goes up to 60° C. The mixture is then heated to 160–165° C. until all evolution of water has ceased and for 30 min. longer. The mixture is then cooled to 70° C. and diluted with 100 parts of alcohol. After stirring to produce a homogeneous mixture, the 3-nitrophthalethylolimide is added slowly to a mixture of 94 parts of iron borings, 2 parts of 5-N-hydrochloric acid and 125 parts of water. The addition requires about 30 min. The mixture is then refluxed for one hour, after which the alcohol is removed by distillation and water is added to maintain the original volume. The iron slurry is filtered hot and the presscake washed with 25 parts of water at 95° C. The filtrate is cooled to 15–20° C. with stirring to precipitate the 3-aminophthalethylolimide. The yellow crystalline product thus obtained melts at 145–146° C. 25 parts of 3-aminophthalethylolimide is added over a 5 min. period to 90 parts of sulfuric acid (D=1.84) at 95° C. The temperature of the sulfonating mixture is maintained at 95° C. for 2 hours, after which it is drowned in a mixture of 150 parts of ice and 100 parts of water. After stirring for 15 min. the precipitated, sulfonated aminophthalethylolimide is removed by filtration, washed with a sodium sulfate solution and dried. The yellow, high-melting, sulfonated product thus obtained gives an aqueous solution which fluoresces blue-green.

10 parts of a wool skein is heated at substantially the boiling point in a bath consisting of 0.2 part of sulfonated 3-aminophthalethylolimide, 1 part of Glauber's salt, 0.4 part of 28% acetic acid and 350 parts of water for one-half hour, after which 0.3 part of sulfuric acid is added and the boiling continued for an additional one-half hour. The dyeing is then rinsed and dried. The fibers thus produced have only a slight yellow cast in daylight and a brilliant yellow-green shade under ultra-violet light.

*Example 2*

Example 3 was repeated substituting a primary propanolamine for the monoethanolamine. The product, after sulfonation, gave a wool dyeing of similar properties.

*Example 3*

Example 3 was repeated substituting a primary butanolamine for the monoethanolamine. The product after sulfonation gave a wool dyeing of similar properties.

*Example 4*

10 parts of a wool skein is heated at substantially the boiling point in a bath consisting of 0.2 part of sulfonated 3-aminophthalethylolimide, 0.2 part of Naphthalene Acid Green V (C. I. 735), 1 part of Glauber's salt, 0.4 part of 28% acetic acid and 350 parts of water for one-half hour, after which 0.3 part of sulfuric acid is added and the boiling continued for an additional one-half hour. The dyeing is then rinsed and dried. The product has a similar green shade in either daylight or ultra-violet light.

*Example 5*

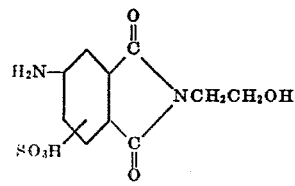

53 parts of 4-nitrophthalic acid is slurried in 50 parts of water, and 16.8 parts of monoethanolamine is added. An exothermic reaction results and the temperature of the mixture goes up to 60° C. The reaction mixture is then heated to 160°–165° C. until all evolution of water has ceased and for 30 min. longer. The mixture is then cooled to 70° C. and diluted with 100 parts of alcohol. After stirring to produce a homogeneous mixture, the 4-nitrophthalethylolimide is added slowly to a previously boiled and cooled mixture of 94 parts of iron borings, 2 parts of 5-N-hydrochloric acid and 125 parts of water. The addition requires about 30 minutes. The mixture is then refluxed for one hour after which the alcohol is removed by distillation and water is added to maintain the original volume. The iron slurry is filtered hot and the presscake washed with 25 parts of water at 95° C. The filtrate is cooled to 15–20° C. with stirring to precipitate 4-aminophthalethylolimide. It is a yellow crystalline solid melting at 168° C.

25 parts of 4-aminophthalethylolimide is added over a 5 minute period to 90 parts of sulfuric acid (D=1.84) at 95° C. The temperature of the mixture is maintained at 95° C. for 2 hours after which it is drowned in 150 parts of ice and 100 parts of water. After stirring for 15 min. the precipitated sulfonated 4-aminophthalethylolimide is removed by filtration, washed with sodium sulfate solution, and dried. The yellow, high-melting, sulfonated product thus obtained gives aqueous solutions which fluoresce blue-green.

10 parts of a wool skein is heated at substantially the boiling point in a bath consisting of 0.2 part of sulfonated 4-aminophthalethylolimide, 1 part of Glauber's salt, 0.4 part of 28% acetic acid and 350 parts of water for one-half hour, after which 0.3 part of sulfuric acid is added and the boiling continued for an additional one-half hour. The dyeing is then rinsed and dried. The fibers thus produced have only a slight yellow cast in daylight and a brilliant yellow-green shade under ultra-violet light.

We claim:

1. As a dyestuff for nitrogenous fibers, a sulfonated aminophthalalkylolimide.
2. As a dyestuff for nitrogenous fibers, a sulfonated 3-aminophthalethylolimide.
3. As a dyestuff for nitrogenous fibers, a sulfonated 4-aminophthalethylolimide.

4. As new compositions of matter nitrogenous textile fibers dyed with a sulfonated aminophthalalkylolimide.

5. As a new composition of matter nitrogenous textile fibers dyed with sulfonated 3-aminophthalethylolimide.

6. As a new composition of matter nitrogenous textile fibers dyed with sulfonated 4-aminophthalethylolimide.

HAROLD T. LACEY.
ROBERT E. BROUILLARD.

REFERENCES CITED

The following references are of record in the file of this patent:

UNITED STATES PATENTS

| Number | Name | Date |
|---|---|---|
| 1,446,860 | Seyer | Feb. 27, 1923 |
| 1,836,529 | Eckert et al. | Dec. 15, 1931 |
| 2,273,444 | Koeberle et al. | Feb. 17, 1942 |
| 2,343,198 | Moore | Feb. 29, 1944 |

OTHER REFERENCES

Mullins, "Acetate Silk and its Dyes," (1927), page 110.

Beilstein, 4th edition, vol. 22, page 534.